(12) United States Patent
Muske (10) Patent No.: US 11,676,510 B2
(45) Date of Patent: Jun. 13, 2023

(54) WELDING SIMULATION SYSTEMS WITH OBSERVATION DEVICES

(71) Applicant: ILLINOIS TOOL WORKS INC., Glenview, IL (US)

(72) Inventor: Mitchell James Muske, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/209,755

(22) Filed: Mar. 23, 2021

(65) Prior Publication Data

US 2022/0309951 A1   Sep. 29, 2022

(51) Int. Cl.
*G09B 19/24* (2006.01)
*G09B 9/00* (2006.01)
*H04Q 9/00* (2006.01)

(52) U.S. Cl.
CPC .............. *G09B 19/24* (2013.01); *G09B 9/00* (2013.01); *H04Q 9/00* (2013.01)

(58) Field of Classification Search
CPC .......... G09B 19/24; B23K 9/09; B23K 9/095; B23K 9/0953
See application file for complete search history.

(56) References Cited

U.S. PATENT DOCUMENTS

| 2013/0183645 A1* | 7/2013 | Wallace ................... B23K 9/00 434/234 |
| 2016/0267806 A1 | 9/2016 | Hsu et al. |
| 2017/0200394 A1* | 7/2017 | Albrecht ................ G09B 19/24 |
| 2018/0308385 A1 | 10/2018 | Sommers et al. |
| 2020/0265749 A1 | 8/2020 | Becker et al. |

OTHER PUBLICATIONS

Europe Patent Office, extended European search report, Application No. 22162684.9, dated Aug. 12, 2022, 10 pages.

* cited by examiner

*Primary Examiner* — Robert J Utama
(74) *Attorney, Agent, or Firm* — McAndrews, Held & Malloy, Ltd.

(57) ABSTRACT

Described herein are examples of welding simulation systems with observation devices that facilitate the types of group interactions that occur in conventional weld training. In some examples, third party observers may use the observation devices to observe the welding simulation from their own perspectives. In some examples, this may allow for traditional "over the shoulder" observation, and/or group/classroom observation and interaction.

20 Claims, 7 Drawing Sheets

WELDING SIMULATION SYSTEMS WITH OBSERVATION DEVICES

TECHNICAL FIELD

The present disclosure generally relates to welding simulation systems, and, more particularly, welding simulation systems with observation devices.

BACKGROUND

Welding simulation systems were developed for weld training in order to address disadvantages of conventional weld training systems. The simulation systems are used to train and/or provide feedback to both new and experienced welding operators. By training on welding simulation systems, rather than live welding systems, wasted material can be minimized, and trainers can avoid the necessity of having inexperienced operators use delicate and/or expensive real world equipment.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to welding simulation systems with observation devices, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Conventionally, during live weld training, an instructor may observe over the shoulder of a student operator in order to give real time feedback and coaching. Other students may observe this interaction from their own perspective. The instructor may also act as an operator; performing example welds while students gather around and observe from their own perspective.

Unfortunately, conventional welding simulation systems do not allow for these same types of interaction. While some welding simulation systems may provide an additional screen so others can observe the welding simulation, this additional screen only shows a mirror image of the welding simulation that the operator is seeing. Though mirroring is better than nothing, mirroring does not allow observers to view the welding simulation from their own perspective, or participate in typical student/instructor and/or classroom interactions.

Some examples of the present disclosure relate to welding simulation systems with observation devices that facilitate the types of group interactions that occur in conventional weld training. In some examples, third party observers may use the observation devices to observe the welding simulation from their own perspectives (e.g., position, angle, height, etc. with respect to relevant real world items of the welding simulation). In some examples, this may allow for traditional "over the shoulder" observation, and/or group/classroom observation and interaction.

Some examples of the present disclosure relate to a non-transitory machine readable medium comprising machine readable instructions which, when executed by a processor, cause the processor to: receive, via device communication circuitry of an observation device, welding simulation data from a welding simulator synchronized with the observation device; capture, via a device sensor of the observation device, sensor data from a first perspective of the device sensor, the first perspective being different than a second perspective of a simulator sensor of the welding simulator; determine one or more simulation stimuli based on the sensor data and the welding simulation data received from the welding simulator; and output the one or more simulation stimuli via a simulation interface of the simulation observation device.

In some examples, determining the one or more simulation stimuli comprises sending the sensor data to the welding simulator, via the device communication circuitry, and receiving the welding simulation data in response, the welding simulation data comprising the one or more simulation stimuli. In some examples, the one or more simulation stimuli comprises one or more images of a welding arc, a weld puddle, a weld bead, welding fumes, a welding-type tool, or a workpiece material. In some examples, determining the one or more simulation stimuli comprises generating the one or more simulation stimuli based on the sensor data and the welding simulation data received from the welding simulator.

In some examples, the one or more simulation stimuli are further generated based on whether there is an indication that a welding-type tool has been activated. In some examples, the indication comprises a signal received from the welding-type tool or the welding simulator representative of a trigger or foot pedal activation, a recognition of an activation indicator in the sensor data, or a recognition that the sensor data represents a workpiece and an electrode of the welding-type tool being separated by less than a threshold distance. In some examples, the device sensor comprises a camera sensor, optical sensor, infra-red sensor, thermal sensor, acoustic sensor, ultrasonic sensor, electromagnetic sensor, inertial measurement sensor, accelerometer, gyroscope, or magnetometer.

Some examples of the present disclosure relate to a method of an observing a welding simulation, comprising: receiving, at an observation device, welding simulation data from a welding simulator; capturing, via a device sensor of the observation device, sensor data from a perspective of the observation device; determining, via device processing circuitry of the observation device, one or more simulation stimuli, based on the sensor data and the welding simulation data; and outputting the one or more simulation stimuli via a device interface of the observation device.

In some examples, the welding simulator or the observation device comprises a welding helmet or a mobile device. In some examples, the one or more simulation stimuli comprises one or more images of a welding arc, a weld puddle, a weld bead, welding fumes, a welding-type tool, or a workpiece material. In some examples, the welding simulation data comprises data representative of a past or current welding technique parameter, bead profile, position or orientation of a welding tool, position or orientation of a workpiece, wire feed speed, voltage, current, wire diameter, wire type, workpiece material type, workpiece material thickness, gas type, gas flow rate, joint position, joint type, joint geometry, simulation exercise, or pulse frequency.

In some examples, the one or more simulation stimuli are further determined based on whether there is an indication that a welding-type tool has been activated. In some examples, the indication comprises a signal received from the welding-type tool or the welding simulator representative of a trigger or foot pedal activation, a recognition of an activation indicator in the sensor data, or a recognition that the sensor data represents a workpiece and an electrode of the welding-type tool being separated by less than a threshold distance. In some examples, the device sensor comprises a camera sensor, optical sensor, infra-red sensor, thermal sensor, acoustic sensor, ultrasonic sensor, electromagnetic sensor, inertial measurement sensor, accelerometer, gyroscope, or magnetometer.

Some examples of the present disclosure relate to a welding simulation system, comprising: a welding simulator comprising: a simulator interface, a simulator sensor, simulator processing circuitry, and simulator memory circuitry comprising first machine readable instructions which, when executed by the simulator processing circuitry, cause the simulator processing circuitry to: capture, via the simulator sensor, first sensor data at a first perspective, generate one or more first simulation stimuli based on the first sensor data and welding simulation data, and output the one or more first simulation stimuli via the simulator interface; and an observation device synchronized with the welding simulator, the observation device comprising: a device interface, a device sensor, device communication circuitry configured to receive welding simulation data from the welding simulator, device processing circuitry, and device memory circuitry comprising second machine readable instructions which, when executed by the device processing circuitry, cause the device processing circuitry to: capture, via the device sensor, second sensor data at a second perspective, determine one or more second simulation stimuli based on the second sensor data and the welding simulation data, and output the one or more second welding simulation stimuli via the device interface.

In some examples, the welding simulator or the observation device comprises a welding helmet or a mobile device. In some examples, the one or more simulation stimuli comprises one or more images of a welding arc, a weld puddle, a weld bead, welding fumes, a welding-type tool, or a workpiece material. In some examples, the welding simulation data comprises data representative of a past or current welding technique parameter, bead profile, position or orientation of a welding tool, position or orientation of a workpiece, wire feed speed, voltage, current, wire diameter, wire type, workpiece material type, workpiece material thickness, gas type, gas flow rate, joint position, joint type, joint geometry, simulation exercise, or pulse frequency. In some examples, the one or more second simulation stimuli are further generated based on whether there is an indication that a welding-type tool has been activated. In some examples, the indication comprises a signal received from the welding-type tool or the welding simulator representative of a trigger or foot pedal activation, a recognition of an activation indicator in the sensor data, or a recognition that the sensor data represents a workpiece and an electrode of the welding-type tool being separated by less than a threshold distance.

Figure 1:
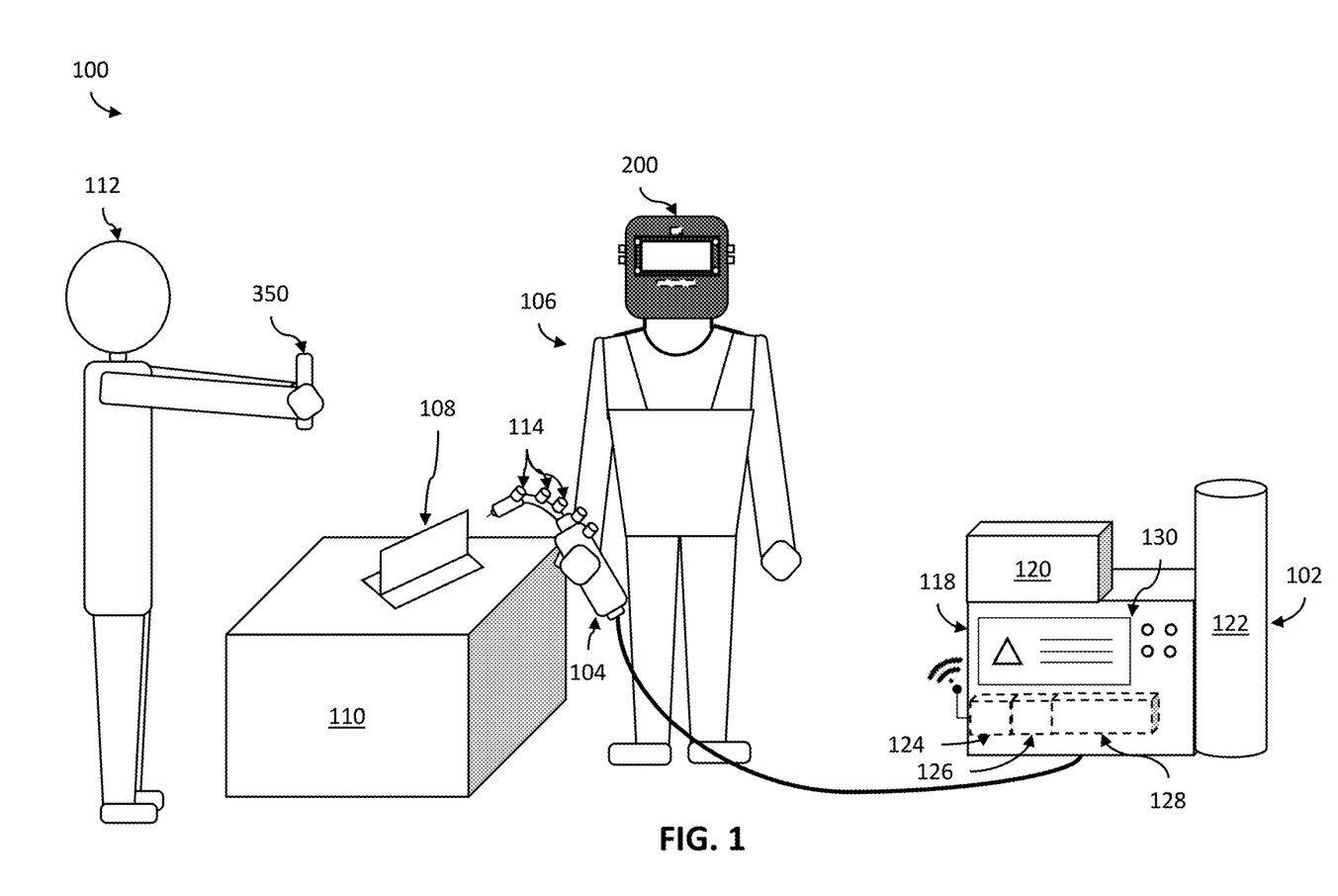
FIG. 1 shows an example of a welding simulation system being used by an single operator and several observers, in accordance with aspects of this disclosure.

FIG. 1 shows an example of a welding simulation system 100. As shown, the welding simulation system 100 includes welding-type equipment 102 connected (e.g., electrically) with a welding-type tool 104. In the example of FIG. 1, an operator 106 wearing a welding helmet 200 is using the welding-type tool 104 to perform a welding-type operation on a workpiece 108 sitting on a welding bench 110. An observer 112 holding an observation device 350 is shown watching the operator 106 perform the welding-type operation.

While not shown in the example of FIG. 1, in some examples, the welding-type equipment 102 may also be (e.g., electrically) connected to the welding bench 110 and/or workpiece 108. Though only one observer 112 is shown in the example of FIG. 1 for the sake of simplicity, in some examples there may be several observers 112 with several different observation devices 350. While shown as a handheld mobile device (e.g., smartphone, tablet, etc.) in the example of FIG. 1, in some examples, the observation device 350 may instead be a welding helmet 200 or other device.

In some examples, the welding helmet 200 worn by the operator 106 in FIG. 1 may implement a welding simulator 300 (e.g., shown in FIG. 3) configured to conduct a welding simulation. In some examples, the welding simulator 300 may also include the welding-type equipment 102, welding-type tool 104, and/or a separate computational device (e.g., desktop/laptop/server computer). In some examples, the welding simulator 300 may be configured to conduct a welding simulation that is an augmented or mixed reality welding simulation. In some examples, the welding simulator 300 may conduct the welding simulation by outputting simulation stimuli (e.g., visual effects, audio effects, haptic effects, and/or other sensory stimulations perceptible to the operator 106) while still allowing the operator 106 to perceive some or all of the real world. The stimuli output by the welding simulator 300 may overlap with (and/or augment) real world stimuli, resulting in an augmented, mixed, mediated, or simulated reality.

In some examples, the welding simulator 300 may simulate various stimuli that occur during live, real world, welding-type operations, such as, for example the sight, sound, and/or feel of a welding arc, a molten weld puddle, a weld bead, welding fumes, spatter, sparks, a welding-type tool, a workpiece material, and/or an auto-darkening filter (ADF). In this way, the welding simulator 300 can provide the operator 106 with a simulated version of a live welding-type operation. In some examples, the welding simulator 300 may instead be used during an actual live welding-type operation.

In some examples, the welding simulator 300 may provide real time feedback to an operator 106 during a simulated or live welding-type operation. For example, the welding simulator 300 may provide feedback to the operator 106 with respect to a welding technique of the operator 106, welding parameters set by the operator 106, and/or other aspects of the welding simulation. In some examples, the feedback may be provided visually at a periphery of the operator 106, to avoid interfering with the ability of the operator 106 to see and/or otherwise perceive the live welding-type operation. In some examples, the feedback may also be considered simulation stimuli.

Figure 2A:
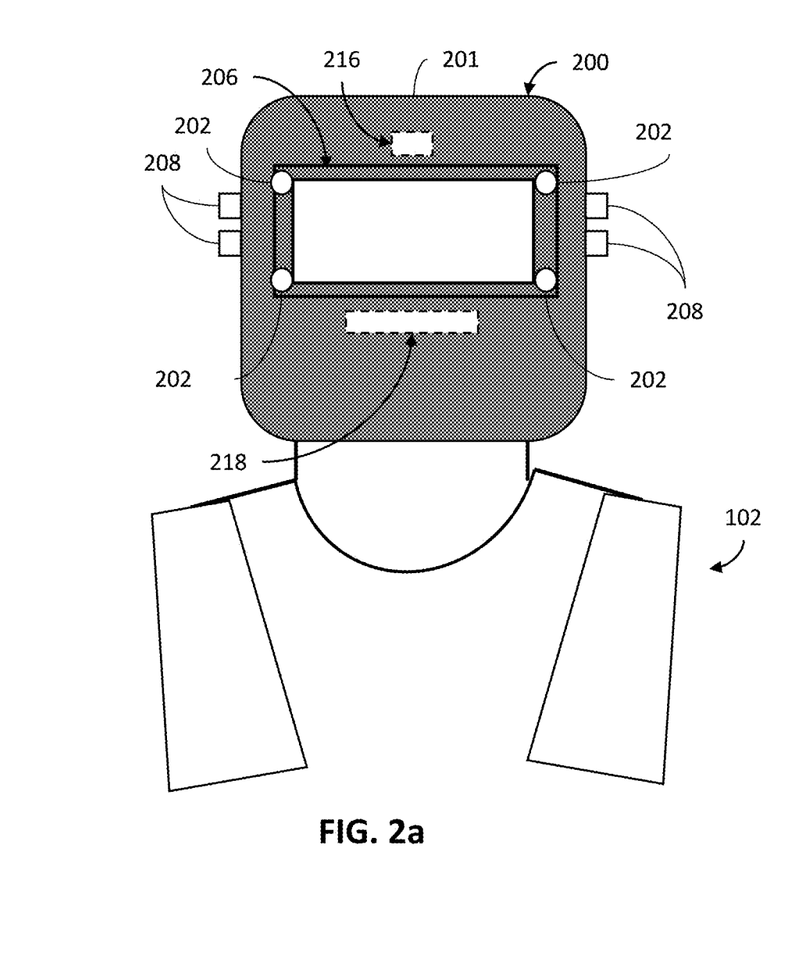
FIGS. 2a-2b show example front and side views of a welding helmet that may be used in the weld tracking system of FIG. 1, in accordance with aspects of this disclosure.
Figure 2B:
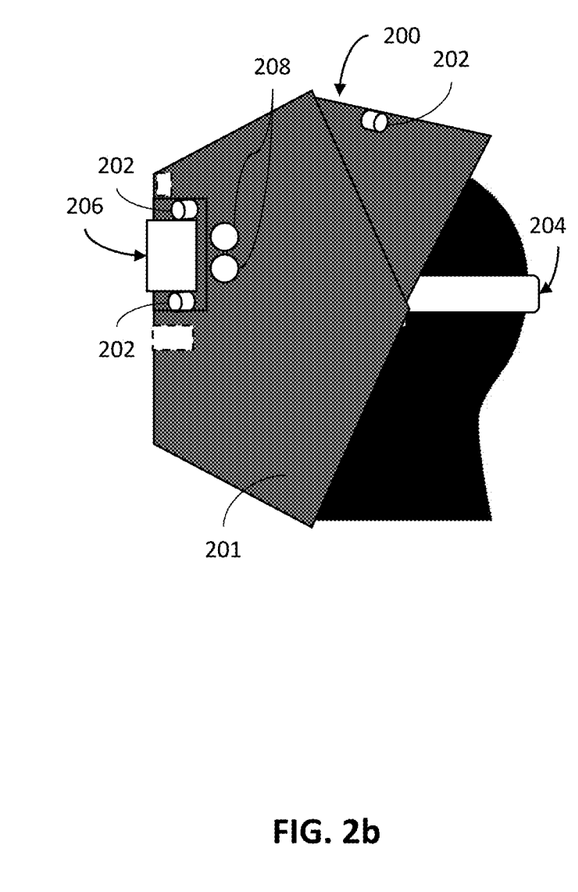

In order to conduct the welding simulation convincingly, the welding simulator 300 may track the position and/or orientation of certain items. For example, the welding simulator 300 may track the position and/or orientation of the workpiece 108, the welding bench 110, the welding-type tool 104, and/or certain portions of the welding-type tool 104 (e.g., the nozzle, contact tip, etc.). In examples where live welding occurs, the welding simulator 300 may track the position and/or orientation of a welding arc. In some examples, the welding simulator 300 may track the position and/or orientation of itself (e.g., where the welding simulator is a welding helmet 200), which may, in some situations, help the simulator 300 to distinguish between movement of simulator 300 and movement of items tracked by the simulator 300. In some examples, the welding simulator 300 may track positions and/or orientations using simulator sensors 302, discussed further below with respect to FIGS. 2-3.

In some examples, markers 114 may assist the welding simulator 300 and/or welding simulation system 100 in tracking the position and/or orientation of the welding-type tool 110. For example, the markers 114 may be easily recognizable by the welding simulator 300 in (e.g., image) data captured by the helmet sensors 202, and thus assist in recognition of the welding-type tool 104.

In some examples, the markers 114 may assist in identifying and/or recognizing particular portions of the welding-type tool 110. For example, the markers 114 may define (and/or may be calibrated to define) a recognizable and/or unique geometric configuration (and/or rigid body). In some examples, this geometric configuration (and/or rigid body) can be correlated (e.g., in memory) with a known (e.g., stored in memory) structural configuration and/or model of the welding-type tool 110. Thus, by identifying and/or tracking the particular geometric configuration of markers 114, the weld tracking system 100 may be able to identify and/or track the structural configuration of the welding-type tool 110; including particular portions (e.g., nozzle, neck, handle, etc.) of the structural configuration.

In some examples, the welding-type tool 110 may include no markers 114. In such examples, the weld tracking system 100 may instead use object recognition, computer vision, and/or other image processing techniques to identify, recognize, and/or track the welding-type tool 110.

In some examples, the welding-type tool 110 may include at least three markers 114 fixed to the welding-type tool 110 relative to one another in a single plane, and a fourth marker 114 fixed to the welding-type tool 110 in a different (e.g., adjacent) plane, to define a rigid body. While a certain number of markers 114 are shown in the example of FIG. 1 attached to the handle, neck, and nozzle of the welding-type tool 110 for the purposes of illustration, in some examples more or fewer markers 114 may be attached to the handle, neck, nozzle, and/or other portions of the welding-type tool 110.

While depicted in FIG. 1 as a welding torch or gun configured for gas metal arc welding (GMAW), in some examples, the welding-type tool 110 may instead be a different welding-type tool 110. For example, the welding-type tool 110 may be an electrode holder (i.e., stinger) configured for shielded metal arc welding (SMAW), a torch and/or filler rod configured for gas tungsten arc welding (GTAW), a welding gun configured for flux-cored arc welding (FCAW), and/or a plasma cutter. In some examples, the welding-type tool 110 may be a mock welding-type tool, and/or be configured for mock (as opposed to live) welding-type operations, such as for welding simulations.

In the example of FIG. 1, the welding-type tool 110 is connected to welding-type equipment 102. In examples where live welding-type operations are conducted, the welding-type equipment 102 may provide welding-type power and/or consumables to the welding-type tool 110, and/or information to the welding-type simulator 300. In some examples where live welding-type operations are conducted, the welding-type tool 110 may transmit one or more signals to the welding-type equipment 102 (and/or welding simulator 300 and/or observation device 350) when activated (e.g., via trigger pull, foot pedal press, etc.). In response to the activation signal(s), the welding-type equipment 102 may output welding-type power and/or consumables (e.g., wire and gas) to the welding-type tool 110.

In some examples where simulated welding-type operations are conducted, the welding-type tool 110 may still transmit one or more signals to the welding-type equipment 102 (and/or welding simulator 300 and/or observation device 350) when activated. However, the welding-type equipment 102 may just provide activation information to the welding simulator 300 (and/or observation device 350) in response to the activation signals, rather than outputting power or consumables. In some examples where simulated welding-type operations are conducted, the welding-type equipment 102 may comprise mock welding-type equipment and/or a computational system (e.g., desktop, laptop, etc.). In some examples where simulated welding-type operations are conducted, the welding-type equipment 102 may be omitted altogether.

In the example of FIG. 1, the welding-type equipment 106 comprises a welding-type power supply 118, wire feeder 120, and gas supply 122. In some live welding examples, the wire feeder 120 may be configured to feed wire to the welding-type tool 110. In some live welding examples, the gas supply 122 may be configured to route shielding gas to the welding-type tool 110.

In the example of FIG. 1, the power supply 118 includes power communication circuitry 124, power control circuitry 126, and power conversion circuitry 128 interconnected with one another. In some examples, the power conversion circuitry 128 may be configured to receive input power (e.g., from a generator, a battery, mains power, etc.) and convert the input power to welding-type output power, such as might be suitable for use by the welding-type tool 110 for welding-type operations. In some examples, the power control circuitry 126 may be configured to control operation of the communication circuitry 124, power conversion circuitry 128, wire feeder 120, and/or gas supply 122 (e.g. via one or more control signals) in accordance with one or more welding parameters.

In the example of FIG. 1, the welding-type equipment 102 further includes an operator interface 130. In some examples, the operator interface 130 may comprise one or more display screens, touch screens, knobs, buttons, levers, switches, microphones, speakers, lights, and/or other mechanisms through which an operator 106 may provide input to, and/or receive output from, the welding-type equipment. For example, an operator 106 may use the operator interface 130 to input one or more welding parameters (e.g., target voltage, current, wire feed speed, wire/filler type, wire/filler diameter, gas type, gas flow rate, welding-type process, material type of workpiece 106, position of welding-type process, joint position, joint type, joint geometry/thickness, etc.). As another example, the operator 106 may use the operator interface 130 to view and/or otherwise understand the current welding parameters of the welding-type equipment 102.

While shown as part of the power supply 118 in FIG. 1, in some examples, the operator interface 130, power control circuitry 126, and/or power communication circuitry 124 (and/or some other control/communication circuitry) may be part of the wire feeder 120 and/or gas supply 122. In some examples, the power communication circuitry 124 may be configured to facilitate communication with the welding-type tool 110, welding simulator 300, observation device 350, and/or welding helmet 200.

In some examples, the welding helmet 200 worn by the operator 106 may act as a welding simulator 300. In some examples, the welding helmet 200 may further interact with a separate computing system (not shown) to implement the welding simulator 300. However, in some examples, the welding helmet 200 itself may fully and independently comprise the welding simulator 300.

FIGS. 2a-2b show enlarged front and side view of an example welding helmet 200. While shown a welding helmet 200 in the examples of FIGS. 2a-2b, in some examples, the welding helmet 200 may be a different sort of headgear. For example, the welding helmet 200 may instead be implemented via goggles, a non-welding helmet, a visor, and/or other appropriate wearables.

In the example of FIGS. 2a-2b, the welding helmet 200 comprises a helmet shell 201 attached to a suspension 204. As shown, the suspension 204 comprises several straps and/or bands configured to wrap around the head of an operator 102. The straps are connected to one another and to the helmet shell 201 at least at two side attachment points on either side of the head of the operator 102. In some examples, the helmet 200 may be configured to rotate and/or pivot about the side attachment points to transition between raised and lowered positions.

In the examples of FIGS. 2a-2b, the welding helmet 200 also includes a lens assembly 206 fixed to (and/or integrated into) a front portion of the helmet shell 201 at approximately eye level. In some examples, the lens assembly 206 may comprise a mobile device (e.g., smartphone, tablet, etc.). In some examples, the lens assembly 206 may include a cover lens, an auto-darkening filter (ADF), and/or a display screen. In some examples, the cover lens may be (e.g., partially or fully) transparent and/or configured to allow an operator 106 to see through the cover lens and/or view the surrounding environment.

In some examples, the ADF comprises a lens (and/or lens cartridge) with a transparency that varies based on one or more signals provided by a photodiode sensor (and/or other sensor(s)). In some examples, the photodiode sensor (and/or other sensor(s)) may be configured to detect light in front of and/or around the welding helmet 200 and send one or more signals to the ADF when the detected light is above a threshold intensity (e.g., indicating the light is from the arc 112). In this manner, when an arc is present, the lens assembly 206 (and/or ADF) may be darkened to protect the eyes of the operator 106, and when the arc is not present the lens assembly 206 (and/or ADF) may be lightened so that the operator 106 can see the surrounding welding environment. In some examples, the photodiode sensor (and/or other sensor(s)) may also be part of the welding helmet 200, lens assembly 206, and/or ADF. In some examples, such as, for example, where the lens assembly 206 is implemented via a mobile device, the lens assembly may be configured to simulate the effects of an ADF.

In some examples, the lens assembly 206 may further include one or more display screens. In some examples, a display screen may be a near-eye display. In some examples, the display screen(s) may be semi-transparent and/or configured to overlay information (e.g., virtual/simulated/holographic objects, guidance, technique feedback, technique parameters, welding parameters, messages, etc.) onto at least part of cover lens (and/or lens assembly 206). In some examples, the display screen may be integrated into safety glasses attached to (and/or in communication with) the welding helmet 200.

In some examples, a display screen may cover the entire cover lens (and/or lens assembly 206). In some examples where the display screen covers the entire cover lens (and/or lens assembly 206), the ADF may be omitted. In some examples, a display screen may cover only a portion of the cover lens (and/or lens assembly 206), so as to be visible on only one side (e.g., to only one eye). In some examples, providing the display screen over both sides of the lens assembly 206 (and/or eyes) may make stereoscopic display possible, which may make it possible to display images that appear to have more depth. In some examples, a display screen may be positioned at and/or over a periphery of the lens assembly 206, so as to be less distracting.

In some examples, the display screen(s) may be configured to display simulation stimuli and/or feedback. For example, the display screen(s) may display stimuli simulating effects of the ADF, information regarding welding parameters of the welding equipment 102, and/or feedback regarding welding technique parameters (e.g., contact tip to work distance, travel speed, travel angle, work angle, etc.). In some examples, the display screen(s) may display feedback regarding technique parameters as compared to expected technique parameters, and/or welding parameters as compared to expected welding parameters. In some examples, this information may be instead (or additionally) output via other helmet I/O devices 208.

In the examples of FIGS. 2a-2b, the welding helmet 200 includes helmet input/output (I/O) devices 208. In some examples, the helmet I/O devices 208 are devices through which an operator 106 may provide input to, and/or receive output from, the welding helmet 200. In some examples, the I/O devices 208 may include knobs, buttons, levers, switches, touch screens, microphones, speakers, haptic devices, lights (e.g., LEDs), and/or other appropriate I/O devices 208. In some examples, the display screen(s) may be considered part of the helmet I/O devices 208. In some examples, settings of the welding simulation may be controlled and/or presented to the operator 102 via the helmet I/O devices 208. While shown as being retained on an external surface of the helmet shell 201 in the examples of FIGS. 2a-2b for the purposes of illustration, in some examples, some I/O devices 208 may also be retained on an internal surface of the helmet shell 201.

In the examples of FIGS. 2a-2b, the welding helmet 200 also includes helmet sensors 202. Four helmet sensors 202 are shown as part of the lens assembly 206, while a fifth helmet sensor 202 is shown attached to a rear of the helmet shell 201, separate from the lens assembly 206. In some examples, the welding helmet 200 may include more or fewer helmet sensors 202. In some examples, the four helmet sensors 202 of the lens assembly 206 may be used to track the six degree of freedom (DOF) position and/or orientation of items for the welding simulation, while the fifth helmet sensor 202 may be used to track the position and/or orientation of the welding helmet 200 itself.

In some examples, the helmet sensors 202 of the welding helmet 200 may be fixed relative to each other, the helmet shell 201, and/or the display screen(s). In some examples, the relative positions of the helmet sensors 202 of the welding helmet 200 may be known, stored, entered manually, and/or automatically detected during a calibration procedure. In some examples, the helmet sensors 202 may comprise camera sensors, optical sensors, infra-red (IR) sensors, thermal sensors, acoustic sensors, ultrasonic sensors, electromagnetic sensors, inertial measurement sensors, accelerometers, gyroscopes, magnetometers, and/or other appropriate types of sensors.

In the examples of FIGS. 2a-2b, the welding helmet 200 further includes helmet circuitry 218 and a helmet power source 216. In some examples, the helmet circuitry 218 and helmet power source 216 may be internal to the helmet shell 202. In some examples, the helmet power source 216 may provide electrical power to the components of the welding helmet 200. In some examples, the power source 216 may comprise one or more batteries, solar panels, and/or energy harvesting devices. In some examples, one or more components of the welding helmet 200 may have a separate power source from which to draw power. In some examples, the helmet circuitry 218 may support, drive, and/or facilitate operation of the welding helmet 200. In some examples, the power source 216 and/or helmet circuitry 218 may be part of the lens assembly 206.

Figure 3:
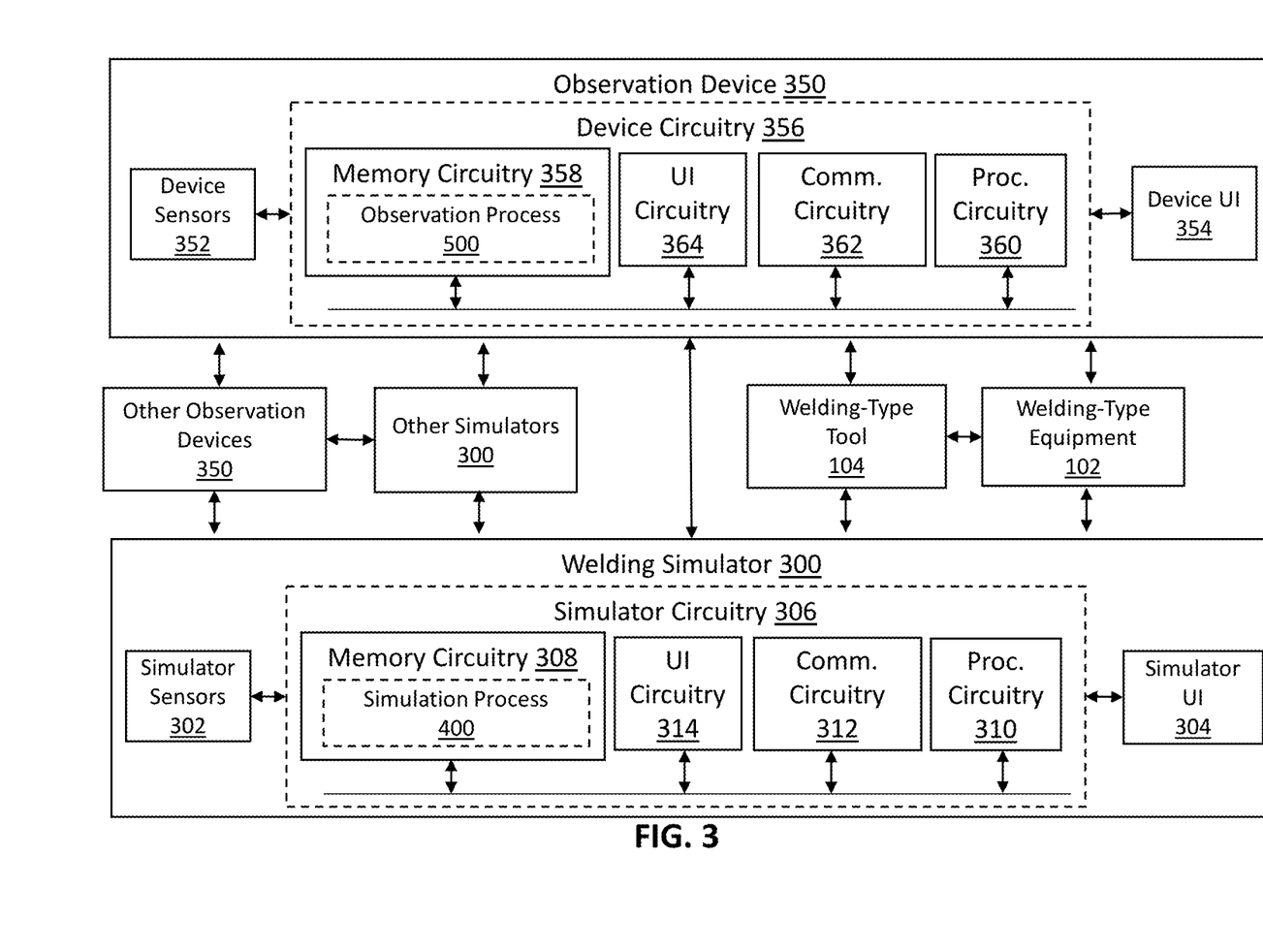
FIG. 3 is a block diagram showing components of the welding simulation system of FIG. 1, in accordance with aspects of this disclosure.

FIG. 3 is a block diagram showing components and interconnections of the welding simulation system 100. In particular, FIG. 3 shows more detailed components of the observation device 350 and the welding simulator 300. In some examples, the observation device 350 and/or the welding simulator 300 may be implemented via the welding helmet 200. While not shown, the welding simulator 300 and/or observation device 350 may further include a power source configured to provide electrical power.

In the example of FIG. 3, both the observation device 350 and the welding simulator 300 are in communication with the welding-type tool 110 and the welding equipment 102. As shown, both the observation device 350 and the welding helmet 200 are also in communication one or more other observation devices 350 and/or welding simulators 300.

In the example of FIG. 3, the welding simulator 300 includes one or more simulator sensors 302, a simulator user interface (UI) 304, and simulator circuitry 306. In some examples where the welding helmet 200 implements the welding simulator 300, the simulator sensors 302 may comprise helmet sensors 202, the simulator UI 304 may comprise the I/O devices 208, and the simulator circuitry 356 may comprise the helmet circuitry 218. As shown, the simulator circuitry 306 includes simulator memory circuitry 308, simulator processing circuitry 310, simulator communication circuitry 312, and simulator UI circuitry 314 interconnected with one another via a common electrical bus.

In the example of FIG. 3, the observation device 350 includes one or more device sensors 352, a device user interface (UI) 354, and device circuitry 356. In examples where the welding helmet 200 implements the observation device 350, the device sensors 352 may comprise helmet sensors 202, the device UI 354 may comprise the I/O devices 208, and the device circuitry 356 may comprise the helmet circuitry 218. As shown, the device circuitry 356 includes device memory circuitry 358, device processing circuitry 360, device communication circuitry 362, and device UI circuitry 364 interconnected with one another via a common electrical bus.

In some examples, the simulator sensors 302 and/or device sensors 352 may comprise one or more camera sensors, optical sensors, infra-red (IR) sensors, thermal sensors, acoustic sensors, ultrasonic sensors, electromagnetic sensors, inertial measurement sensors, accelerometers, gyroscopes, magnetometers, and/or other appropriate types of sensors. In some examples, the device UI 354 and/or simulator UI 304 may comprise one or more display screens, touch screens, knobs, buttons, levers, switches, microphones, speakers, lights, and/or other mechanisms through which input may be provided to, and/or output received from, the observation device 350 and/or welding simulator 300, respectively.

In some examples, the device UI circuitry 364 and/or simulator UI circuitry 314 may comprise one or more drivers for the device UI 354 and/or simulator UI 304, respectively. In some examples, the device UI circuitry 364 and/or simulator UI circuitry 314 may be configured to generate one or more signals representative of input received via the device UI 354 and/or simulator UI 304, respectively, and provide the signal(s) to the bus. In some examples, the device UI circuitry 364 and/or simulator UI circuitry 314 may also be configured to control the device UI 354 and/or simulator UI 304, respectively, to generate one or more outputs in response to one or more signals (e.g., received via the bus).

In some examples, the simulator communication circuitry 312 and/or device communication circuitry 362 may include one or more wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the simulator communication circuitry 312 and/or device communication circuitry 362 may be configured to facilitate communication via one or more wired media and/or protocols (e.g., Ethernet cable(s), universal serial bus cable(s), etc.) and/or wireless mediums and/or protocols (e.g., cellular communication, general packet radio service (GPRS), near field communication (NFC), ultra high frequency radio waves (commonly known as Bluetooth), IEEE 802.11x, Zigbee, HART, LTE, Z-Wave, WirelessHD, WiGig, etc.). In some examples, the simulator communication circuitry 312 and/or device communication circuitry 362 may be coupled to one or more antennas to facilitate wireless communication.

In some examples, the simulator communication circuitry 312 and/or device communication circuitry 362 may be configured to facilitate communications of the observation device 350 and the welding simulator 300. In some examples, the simulator communication circuitry 312 and/or device communication circuitry 362 may receive one or more signals (e.g., from the welding-type tool 110, welding-type equipment 102, etc.) decode the signal(s), and provide the decoded data to the electrical bus. As another example, the simulator communication circuitry 312 and/or device communication circuitry 362 may receive one or more signals from the electrical bus (e.g., representative of one or more inputs received via the device UI circuitry 364 and/or simulator UI circuitry 314) encode the signal(s), and transmit the encoded signal(s) to an external device (e.g., welding-type tool 110, welding-type equipment 102, etc.).

In some examples, the device processing circuitry 360 and/or simulator processing circuitry 310 may comprise one or more processors, controllers, and/or graphical processing units (GPUs). In some examples, the device processing circuitry 360 and/or simulator processing circuitry 310 may comprise one or more drivers for the device sensors 302 and/or simulator sensors 302, respectively. In some examples, the device processing circuitry 360 and/or simulator processing circuitry 310 may be configured to execute machine readable instructions stored in the device memory circuitry 358 and/or simulator memory circuitry 308.

In the example of FIG. 3, the simulator memory circuitry 308 includes (and/or stores) a welding simulation process 400. As shown, the device memory circuitry 358 includes (and/or stores) a simulation observation process 500. In some examples, the welding simulation process 400 and/or simulation observation process 500 may comprise machine readable instructions configured for execution by the device processing circuitry 360 and/or helmet processing circuitry 304.

In some examples, the welding simulation process 400 may process sensor data captured by helmet sensors 202 and track the 6 DOF position and/or orientation of the welding-type tool 110, workpiece(s) 106, and/or other relevant items using the captured sensor data. The welding simulation process 400 may use the 6 DOF position(s) and/or orientation(s) (e.g., in conjunction with other information) to determine what simulation stimuli to output, as well as how and/or where to output, in order to effectively (and/or convincingly) simulate the welding-type operation, workpiece material, etc. The welding simulation process 400 may further determine certain welding technique parameters of the welding operator 106 based on the 6 DOF position and/or orientation of the welding-type tool 110, workpiece(s) 106, and/or other relevant items. In some examples, the welding simulation process 400 may provide feedback to an operator 106 regarding the determined welding technique parameters (and/or welding parameters), in view of one or more expected welding technique parameters (and/or welding parameters).

Figure 4:
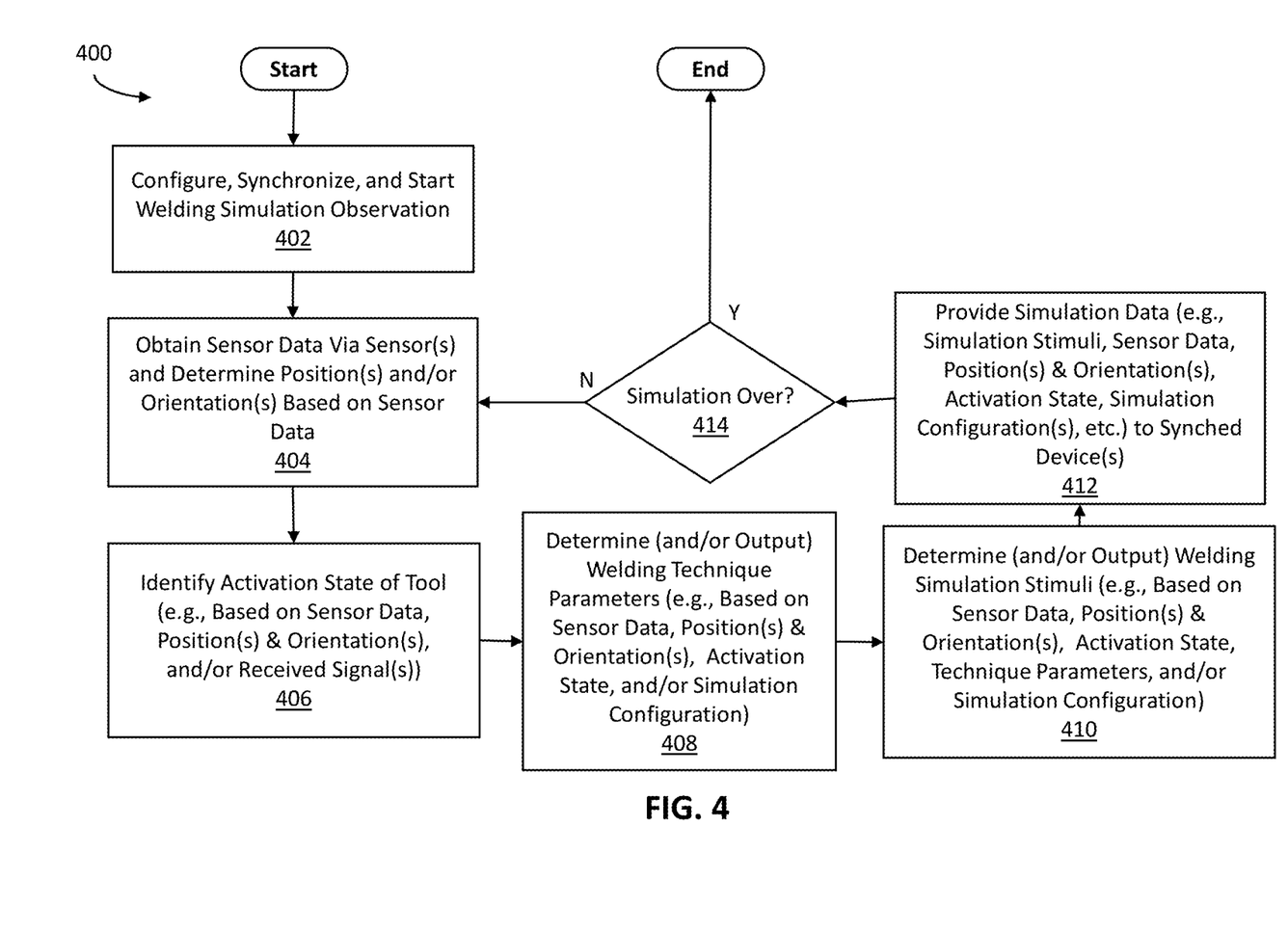
FIG. 4 is a flow diagram illustrating an example operation of a welding simulation process, in accordance with aspects of this disclosure.

FIG. 4 is a flowchart illustrating operation of an example welding simulation process 400. In the example of FIG. 4, the welding simulation process 400 begins at block 402, where the welding simulation process 400 configures a welding simulation. In some examples, configuring the welding simulation may comprise configuring the welding simulator 300, other welding simulators 300, and/or observation devices 350, so that they can communicate with one another, with the welding-type equipment 102, and/or with the welding-type tool 104. For example, the welding simulator 300 may receive identification information (e.g., via simulator UI 304) pertaining to the welding-type equipment 102, the welding-type tool 104, observation devices 350, and/or other welding simulators 300 with which the welding simulation process 400 may use to establish communication (e.g., via simulator communication circuitry 312).

In some examples, configuring the welding simulation may comprise configuring welding parameters. In some examples, configuring the welding simulation may comprise the welding simulator 300 receiving the welding parameters from the welding-type equipment 102. In some examples, configuring the welding simulation may comprise calibrating the welding simulator 300, such as, for example, calibrating the spatial relationship between the simulator sensors 302, and/or between the simulator sensors 302 and the display screen of the simulator UI.

In some examples, configuring the welding simulation may comprise one or more selections. For example, selecting a (e.g., type of) welding simulation exercise, a (e.g., type of) welding-type tool 104, a (e.g., type of) the welding-type equipment 102, one or more (e.g., types of) markers 114, one or more welding simulation parameters, desired feedback, and/or desired stimuli. In some examples, configuring the welding simulation may comprise selecting whether live or mock welding-type operations will be conducted.

In some examples, an operator 106 may provide one or more inputs (e.g., via the simulator UI 304) to configure the welding simulation process 400. In some examples, the welding simulator 300 may synchronize and/or communicate with one or more observation devices 350 and/or other welding simulators 300 to configure the welding simulation process 400 at block 402. In some examples, the welding simulation process 400 may store the configuration data in simulator memory circuitry 308.

After the configurations are complete, the welding simulation process 400 may begin a welding simulation. In some examples, the welding simulation may begin in response to an input from an operator 106 (e.g., via the simulator UI 304). In some examples, the welding simulation may begin in response to one or more signals received from the welding-type tool 104, welding-type equipment 102, observation device(s) 350, and/or one or more other welding simulators 300. In some examples, the welding simulation process 400 may send one or more signals to other welding simulators 300 and/or observation devices 350 indicating when the welding simulation has started.

In the example of FIG. 4, the welding simulation process 400 proceeds to block 404 after block 402. At block 404, the welding simulation process 400 obtains sensor data from the perspective of the welding simulator 300 via the simulator sensor(s) 302 of the welding simulator 300. Using the sensor data, the welding simulation process 400 determines the position(s) and/or orientation(s) of items tracked by the welding simulation process 400 (e.g., the welding-type tool 104, workpiece(s) 108, etc.) in 6 DOF (e.g., x, y, z coordinates and yaw, pitch, roll angles).

In some examples, the welding simulation process 400 may also obtain sensor data from the perspective of an observation device 350 and/or another welding simulator 300. For examples, the welding simulation process 400 may receive the sensor data from an observation device 350 via one or more signals sent to the welding simulator 300. In some such examples, the welding simulation process 400 may determine the position(s) and/or orientation(s) of the items tracked by the welding simulation process 400 using the received sensor data. In some examples, the welding simulation process 400 may store sensor data and/or the position(s) and/or orientation(s) in simulator memory circuitry 308, along with timestamp corresponding information, to keep a history.

In the example of FIG. 4, the welding simulation process 400 proceeds to block 406 after block 404. At block 406, the welding simulation process 400 identifies an activation state of the welding-type tool 104. In some examples, the welding simulation process 400 may determine the activation state based on sensor data. For example, one or more markers 114 on the welding-type tool 104 may change state (e.g., from invisible to visible, lit to unlit, static to blinking, blinking at a first frequency to blinking at a second frequency, etc.) when the welding-type tool 104 is activated.

In some examples, the welding simulation process 400 may determine the activation state based on position/orientation information. For example, the welding simulation process 400 may conclude that the welding-type tool 104 is activated if the welding-type tool 104 (and/or a nozzle, contact tip, etc. of the welding-type tool 104) is within a threshold distance of a workpiece 108. In some examples, the welding simulation process 400 may determine the activation state of the welding-type tool 104 based on one or more signals received from the welding-type tool 104, the welding-type equipment 102, and/or another welding simulator 300. For example, the welding-type tool 104 may send one or more signals to the welding-type equipment 102 when the welding-type tool is activated (and/or deactivated), and the welding-type equipment 102 may send one or more (identical or different) signals to the welding simulator 300. As another example, the welding-type tool 104 may send the one or more signals directly to the welding simulator 300. As another example, another welding simulator 300 that has determined the activation state may send one or more signals representative of the activation state.

In some examples, the welding simulation process 400 may use configuration information from block 402 (e.g., type(s) of welding-type tool 104 and/or marker(s) 114) to determine the activation state. For examples, the welding simulation process 400 may expect to receive an activation signal from the welding-type tool 104 for certain configurations, and expect to receive an activation signal from the welding-type equipment 102 for other configurations. In some examples, the welding simulation process 400 may expect to determine activation state purely from position/orientation information in certain other configurations.

In the example of FIG. 4, the welding simulation process 400 proceeds to block 408 after block 406. At block 408, the welding simulation process 400 determines one or more welding technique parameters. In some examples, the welding simulation process 400 may determine the welding technique parameters based on configuration data, sensor data, position and/or orientation information, and/or the activation state of the welding-type tool 104.

In the example of FIG. 4, the welding simulation process 400 proceeds to block 410 after block 408. At block 410, the welding simulation process 400 generates simulation stimuli based on the simulation configuration, sensor data, position(s)/orientation(s), technique parameter(s), and/or activation state of the welding-type tool 104. In some examples, the simulation stimuli may include visual, audio, and/or haptic stimuli. For example, the simulation stimuli may simulate the sight, sound, and/or feel of an ADF, a welding-type tool 104, workpiece 108 (e.g., material), welding arc, weld puddle, weld bead, and/or welding fumes. In some examples, simulation stimuli may indicate welding parameter information, welding technique parameter information, and/or feedback as to how to adjust and/or improve welding parameters and/or welding technique parameters. In some examples, simulation stimuli may be output via the simulator UI 304. In some examples, simulation stimuli may be output via other devices (e.g., the welding-type tool 104 and/or welding-type equipment 102), such as, for example, in response to one or more signals sent by the welding simulator 300.

In the example of FIG. 4, the welding simulation process 400 proceeds to block 412 after block 410. At block 412, the welding simulator 300 provides simulation data to the observation device(s) 350 and/or other welding simulators 300 in communication with the welding simulator 300. In some examples, the simulation data may be provided via one or more signals sent by the simulator communication circuitry 312. In some examples, the simulation data may include data used by the welding simulator 300 to conduct the simulation, such as, for example, the configuration data, and/or past or present sensor data, position/orientation data, technique parameters, activation state(s), and/or simulation stimuli generated and/or output by the welding simulator 300. In some examples, the simulation stimuli generated by the welding simulator 300 may be generated for the observation device(s) 350 and/or other welding simulators 300 to output.

In the example of FIG. 4, the welding simulation process 400 proceeds to block 414 after block 412. At block 414, the welding simulation process 400 determines whether the welding simulation process 400 should terminate. In some examples, the determination may be made based on one or more inputs received (or not received) via the simulator UI 304 and/or simulator communication circuitry 312. As shown, the welding simulation process 400 returns to block 404 if the welding simulation process 400 determines that the welding simulation process 400 should not terminate. The welding simulation process 400 ends after block 414 if the welding simulation process 400 determines that the welding simulation process 400 should terminate (though, in some examples, the welding simulation process 400 may instead return to block 402). In some examples, the welding simulation process 400 may communicate the determination at block 414 to synched observation devices 350 and/or welding simulators 300.

Figure 5:
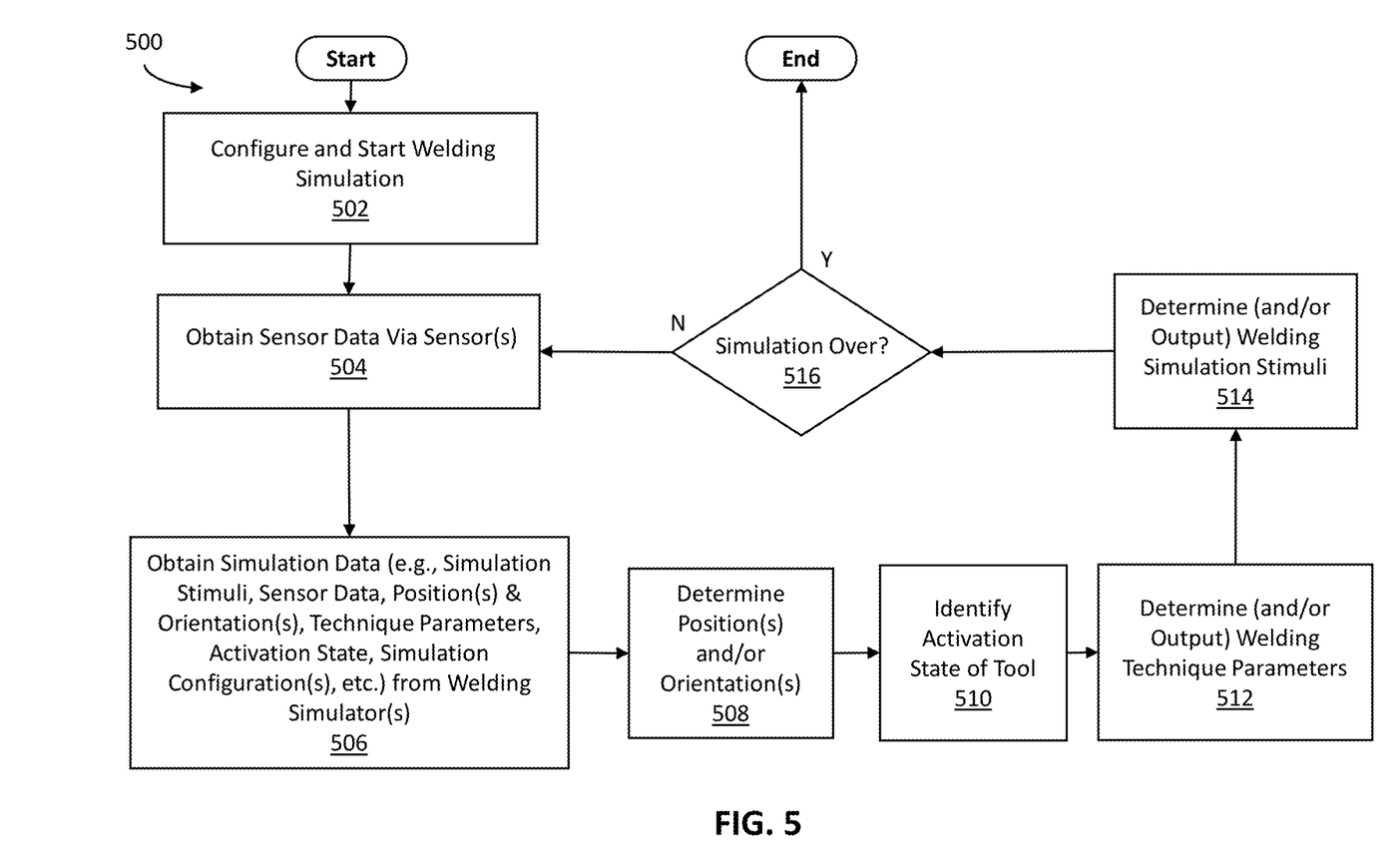
FIG. 5 is a flow diagram illustrating an example operation of a simulation observation process, in accordance with aspects of this disclosure.

FIG. 5 is a flowchart illustrating operation of an example simulation observation process 500. In some examples, the simulation observation process 500 may synchronize the observation device 350 with a welding simulator 300 and/or the welding simulation process 400. In some examples, this synchronization may entail and/or allow for communication with the welding simulator 300. Through this communication, the observation device 350 may obtain welding simulation data relevant to the welding simulation. The observation device 350 may also capture sensor data (e.g., via device sensors 352) from its own perspective, and use the sensor data and welding simulation data to output simulation stimuli that allows an observer 112 to perceive the welding simulation from their own unique perspective.

In the example of FIG. 5, the simulation observation process 500 begins at block 502, where the simulation observation process 500 synchronizes the observation device 350 with a welding simulator 300 conducting (or preparing to conduct) a welding simulation, and/or otherwise configures the observation device 350 and/or observation process 500 for observation of the welding simulation. In some examples, configuring the observation device 350 and/or observation process 500 may comprise setting up communications with the welding simulator 300, the welding-type equipment 102, the welding-type tool 104, and/or other observation devices 350. For example, the observation process 500 may receive (e.g., via the device UI 354) identification information pertaining to the welding simulator 300, the welding-type equipment 102, the welding-type tool 104, and/or other observation devices 350 with which the simulation observation device 350 may use to establish communication (e.g., via device communication circuitry 362).

In some examples, configuring the observation device 350 and/or observation process 500 may comprise calibrating the observation device 350. For example, the spatial relationship between the device sensor(s) 352, and/or between the device sensor(s) 352 and a display screen of the device UI 354 may be calibrated. In some examples, configuring the observation device 350 and/or observation process 500 may comprise selecting desired (and/or undesired) stimuli (e.g., include welding arc, but not ADF). In some examples, the observation device 350 and/or observation process 500 may default to the same stimuli as the welding simulation, and then allow the observer 112 to make modifications to the default settings. In this way, the observer 112 may become aware of the welding simulation configuration, and may customize their own observation accordingly.

In some examples, configuring the observation device 350 may comprise communicating with the welding simulator 300 to obtain configuration information of the welding simulation, and/or deliver configuration information of the observation process 500. In some examples, configuring the observation device 350 may comprise communicating with the welding simulator 300 to obtain past or present welding simulation data. In some examples, configuring the observation device 350 may comprise communicating with the welding simulator 300 to determine whether the welding simulation has begun.

In the example of FIG. 5, the simulation observation process 500 proceeds to block 504 after block 502 once the welding simulation has begun. At block 504, the simulation observation process 500 obtains sensor data from the perspective of the observation device 350 via the device sensor(s) 352 of the observation device 350. In some examples, the simulation observation process 500 may communicate the sensor data to the welding simulator 300 (and/or some other computational device) for processing.

In the example of FIG. 5, the simulation observation process 500 proceeds to block 506 after block 504. At block 506, the simulation observation process 500 receives welding simulation data from the welding simulator 300 (e.g., by way of one or more signals received via the device communication circuitry 362). In some examples, the simulation data may include data used by the welding simulator 300 to conduct the simulation, such as, for example, the welding simulation configuration, and/or past or present sensor data, position/orientation data, technique parameters, activation state(s), and/or simulation stimuli generated and/or output by the welding simulator 300.

In some examples, the simulation data may comprise position/orientation data determined via sensor data sent by the observation process 500 to the welding simulator 300. In some examples, the simulation data may comprise simulation stimuli for the simulation observation process 500 to output. In some examples, the simulation observation process 500 may store the sensor data, position(s) and/or orientation(s), and/or welding simulation data in device memory circuitry 358, along with timestamp corresponding information, to keep a history.

In the example of FIG. 5, the simulation observation process 500 proceeds to block 508 after block 506. At block 508, the observation process 500 determines position(s) and/or orientation(s) of one or more tracked items. In some examples, this determination may be made based on sensor data captured at block 504 (e.g., similar to block 404 discussed above). In some examples, the determination may be based on welding simulation data received at block 506.

In the example of FIG. 5, the simulation observation process 500 proceeds to block 510 after block 508. At block 510, the simulation observation process 500 identifies an activation state of the welding-type tool 104. In some examples, this identification may be made using sensor data, position/orientation information, received signals, and/or configuration information such as described above with respect to block 406. In some examples, the determination may be based on welding simulation data received at block 506.

In the example of FIG. 5, the simulation observation process 500 proceeds to block 512 after block 510. At block 512, the simulation observation process 500 determines and/or outputs (e.g., via the device UI 354) welding technique parameters. In some examples, the determination may be made based on sensor data, position and/or orientation information, and/or the activation state of the welding-type tool 104, such as described above with respect to block 408. In some examples, the determination may be made based on welding simulation data received at block 506.

In the example of FIG. 5, the simulation observation process 500 proceeds to block 514 after block 512. At block 514, the simulation observation process 500 determines and/or outputs simulation stimuli. In some examples, the observation device 350 may generate the simulation stimuli based on the observation configuration, simulation configuration, sensor data, position(s)/orientation(s), technique parameters, and/or activation state of the welding-type tool 104 (e.g., similar to that which is described above with respect to block 410). In some examples, the observation device 350 may generate the simulation stimuli based on welding simulation data received at block 506. In some examples, the observation device 350 may receive the simulation stimuli from the welding simulator 300 (e.g., via the welding simulation data). In some examples, the observation process 500 may output the stimuli via the device UI 354.

Because the sensor data is obtained from the perspective of the observation device 350, rather than the welding simulator 300, the corresponding simulation stimuli may present a welding simulation from the point of view of the observation device 350 (and/or observer 112), rather than that of the welding simulator 300 (and/or operator 106). Further, the configuration of the observation process 500 may be customized to be different from that of the welding simulation process 400, such that the observer 112 may be presented with different types of stimuli than the operator 106.

Figure 6A:
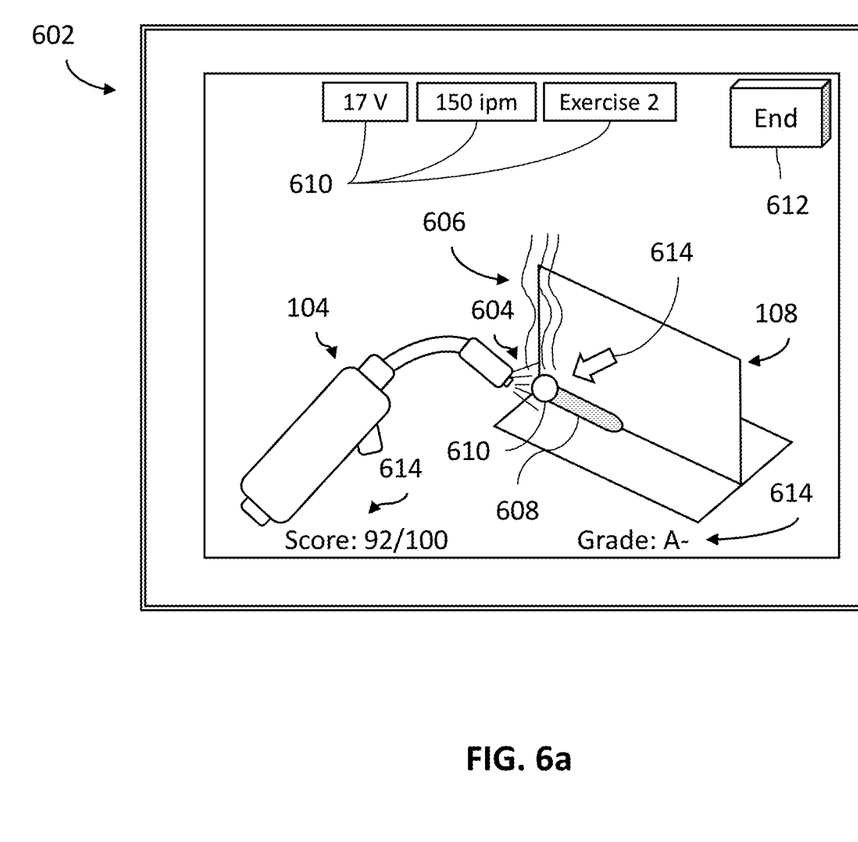
FIGS. 6a-6b show different example perspectives of a welding simulation conducted by the welding simulation system of FIG. 1, in accordance with aspects of this disclosure.
Figure 6B:
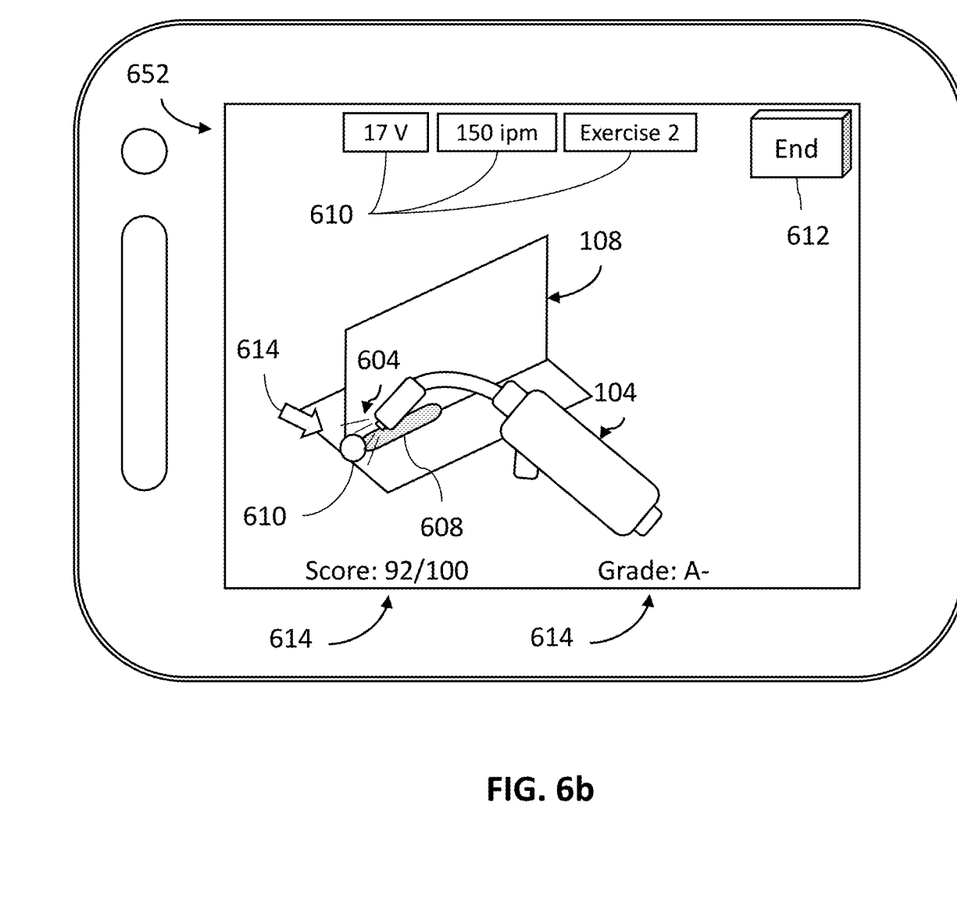

FIGS. 6a-6b show simple examples of a welding simulation presented from different perspectives (and/or using different configurations) of the observation device 350 and the welding simulator 300. In the example of FIG. 6a, a simulator display screen 602 (e.g., of the simulator UI 304) shows a first perspective of the welding simulation. At the first perspective of FIG. 6a, the welding-type tool 104 (or a depiction of the welding-type tool 104) is visible on (or through) the simulator display screen 602, along with the workpiece 108.

Also visible in in the simulator display screen 602 in the example of FIG. 6a is a welding arc 604, welding fumes 606, a welding bead 608, and a molten weld pool 610. At the top of the simulator display screen 602 is shown welding parameters 610 and an end button 612 (e.g., giving the option of end thing welding simulation). At the bottom of the simulator display screen 602 is shown feedback 614 (e.g., regarding welding technique, weld quality) in the form of a score and grade. Feedback 614 is also depicted in the form of an arrow (e.g., to indicate weld placement, speed/angle adjustment, etc.). In some examples, the welding arc 604, welding fumes 606, welding bead 608, molten pool 610, welding parameters 610, end button 612, and feedback 614 may all be considered different forms of simulation stimuli.

In the example of FIG. 6b, a device display screen 652 of the device UI 354 of the observation device 350 of the observer 112 shows a second perspective of the welding simulation. At the second perspective of FIG. 6b, the welding-type tool 104 and workpiece 108 (or a depiction of the welding-type tool 104 and/or workpiece 108) are visible on (or through) the device display screen 652. However, the perspective is reversed, as the observer 112 is viewing the welding simulation on the opposite side of the welding bench 110 from the operator 106. The arc 604, molten pool 610, weld bead 608, and arrow feedback 614 are also differently positioned compared to FIG. 6b, as befitting the change in perspective, while the welding parameters 610, end button 612 (giving the option to end the observation), score feedback 614, and grade feedback 614 remain in largely the same relative locations, despite the change in perspective. Notably, the fumes 606 are entirely absent in FIG. 6b, indicating that the simulation observation process 500 has a different configuration (e.g., with respect to desired simulation stimuli) than the welding simulation process 400.

In the example of FIG. 5, the observation process 500 proceeds to block 516 after block 514. At block 516, the observation process 500 determines whether the current simulation observation should terminate. In some examples, the determination may be made based on one or more inputs received (or not received) via the device UI 354 and/or device communication circuitry 362 (e.g., from the welding simulator 300). As shown, the observation process 500 returns to block 504 after block 516 if the observation does not terminate. The observation process 500 ends after block 516 if the observation does terminate (though, in some examples, the observation process 500 may instead return to block 502). In some examples, the observation process 500 may communicate the determination at block 516 to synched observation devices 350 and/or welding simulators 300.

The disclosed welding simulation system 100 facilitate the types of group interactions that occur in conventional weld training, and that has not been previously available in conventional welding simulation systems. Sensor data captured from the perspective of the observation device 350, along with synchronization between a welding simulator 300 and the observation device 350, allows an observer 112 to experience the welding simulation from their own unique perspective. In some examples, this may allow for traditional "over the shoulder" observation, and/or group/classroom observation and interaction.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

As used herein, welding-type refers to welding (including laser welding and/or hot wire welding), cladding (including laser cladding), brazing, plasma cutting, induction heating, carbon arc cutting or gouging, hot wire preheating, and/or resistive preheating.

As used herein, a welding-type tool refers to a tool suitable for and/or capable of welding (including laser welding and/or hot wire welding), cladding (including laser cladding), brazing, plasma cutting, induction heating, carbon arc cutting or gouging, hot wire preheating, and/or resistive preheating.

As used herein, welding-type power refers to power suitable for welding (including laser welding and/or hot wire welding), cladding (including laser cladding), brazing, plasma cutting, induction heating, carbon arc cutting or gouging, hot wire preheating, and/or resistive preheating.

As used herein, a welding-type power supply and/or welding-type power source refers to a device capable of, when input power is applied thereto, supplying output power suitable for welding (including laser welding and/or hot wire welding), cladding (including laser cladding), brazing, plasma cutting, induction heating, carbon arc cutting or gouging, hot wire preheating, and/or resistive preheating; including but not limited to transformer-rectifiers, inverters, converters, resonant power supplies, quasi-resonant power supplies, switch-mode power supplies, etc., as well as control circuitry and other ancillary circuitry associated therewith.

As used herein, disable may mean deactivate, incapacitate, and/or make inoperative. As used herein, enable may mean activate and/or make operational.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A non-transitory machine readable medium comprising machine readable instructions which, when executed by a processor, cause the processor to:
   receive, via device communication circuitry of an observation device, welding simulation data from a welding simulator synchronized with the observation device;
   capture, via a device sensor of the observation device, sensor data from a first perspective of the device sensor, the first perspective being different than a second perspective of a simulator sensor of the welding simulator with respect to position, angle, or height;
   determine one or more simulation stimuli based on the welding simulation data received from the welding simulator and the sensor data of the device sensor of the observation device; and
   output the one or more simulation stimuli via a simulation interface of the simulation observation device.

2. The non-transitory machine readable medium of claim 1, wherein determining the one or more simulation stimuli comprises sending the sensor data to the welding simulator, via the device communication circuitry, and receiving the welding simulation data in response, the welding simulation data comprising the one or more simulation stimuli.

3. The non-transitory machine readable medium of claim 2, wherein the one or more simulation stimuli comprises one or more images of a welding arc, a weld puddle, a weld bead, welding fumes, a welding-type tool, or a workpiece material.

4. The non-transitory machine readable medium of claim 1, wherein determining the one or more simulation stimuli comprises generating the one or more simulation stimuli based on the sensor data and the welding simulation data received from the welding simulator.

5. The non-transitory machine readable medium of claim 1, wherein the one or more simulation stimuli are further generated based on whether there is an indication that a welding-type tool has been activated.

6. The non-transitory machine readable medium of claim 5, wherein the indication comprises a signal received from the welding-type tool or the welding simulator representative of a trigger or foot pedal activation, a recognition of an activation indicator in the sensor data, or a recognition that the sensor data represents a workpiece and an electrode of the welding-type tool being separated by less than a threshold distance.

7. The non-transitory machine readable medium of claim 1, wherein the device sensor comprises a camera sensor, optical sensor, infra-red sensor, thermal sensor, acoustic sensor, ultrasonic sensor, electromagnetic sensor, inertial measurement sensor, accelerometer, gyroscope, or magnetometer.

8. A method of observing a welding simulation, comprising:
receiving, at an observation device, welding simulation data from a welding simulator;
capturing, via a device sensor of the observation device, sensor data from a first perspective of the observation device, the first perspective being different than a second perspective of a simulator sensor of the welding simulator with respect to position, angle, or height;
determining, via device processing circuitry of the observation device, one or more simulation stimuli, based on the sensor data and the welding simulation data; and
outputting the one or more simulation stimuli via a device interface of the observation device.

9. The method of claim 8, wherein the welding simulator or the observation device comprises a welding helmet or a mobile device.

10. The method of claim 8, wherein the one or more simulation stimuli comprises one or more images of a welding arc, a weld puddle, a weld bead, welding fumes, a welding-type tool, or a workpiece material.

11. The method of claim 8, wherein the welding simulation data comprises data representative of a past or current welding technique parameter, bead profile, position or orientation of a welding tool, position or orientation of a workpiece, wire feed speed, voltage, current, wire diameter, wire type, workpiece material type, workpiece material thickness, gas type, gas flow rate, joint position, joint type, joint geometry, simulation exercise, or pulse frequency.

12. The method of claim 8, wherein the one or more simulation stimuli are further determined based on whether there is an indication that a welding-type tool has been activated.

13. The method of claim 12, wherein the indication comprises a signal received from the welding-type tool or the welding simulator representative of a trigger or foot pedal activation, a recognition of an activation indicator in the sensor data, or a recognition that the sensor data represents a workpiece and an electrode of the welding-type tool being separated by less than a threshold distance.

14. The method of claim 8, wherein the device sensor comprises a camera sensor, optical sensor, infra-red sensor, thermal sensor, acoustic sensor, ultrasonic sensor, electromagnetic sensor, inertial measurement sensor, accelerometer, gyroscope, or magnetometer the sensor data relates to one or more real world items of a welding environment, and the device sensor captures the sensor data at a first perspective having a first position, first angle, or first height with respect to the one or more real world items.

15. A welding simulation system, comprising:
a welding simulator comprising:
a simulator interface, a simulator sensor, simulator processing circuitry, and simulator memory circuitry comprising first machine readable instructions which, when executed by the simulator processing circuitry, cause the simulator processing circuitry to:
capture, via the simulator sensor, first sensor data at a first perspective,
generate one or more first simulation stimuli based on the first sensor data and welding simulation data, and
output the one or more first simulation stimuli via the simulator interface; and an observation device synchronized with the welding simulator, the observation device comprising:
a device interface, a device sensor, device communication circuitry configured to receive welding simulation data from the welding simulator, device processing circuitry, and device memory circuitry comprising second machine readable instructions which, when executed by the device processing circuitry, cause the device processing circuitry to:
capture, via the device sensor, second sensor data at a second perspective, the second perspective being different than the first perspective of the simulator sensor of the welding simulator with respect to position, angle, or height,
determine one or more second simulation stimuli based on the second sensor data and the welding simulation data, and
output the one or more second welding simulation stimuli via the device interface.

16. The welding simulation system of claim 15, wherein the welding simulator or the observation device comprises a welding helmet or a mobile device.

17. The welding simulation system of claim 15, wherein the one or more first or second simulation stimuli comprises one or more images of a welding arc, a weld puddle, a weld bead, welding fumes, a welding-type tool, or a workpiece material.

18. The welding simulation system of claim 15, wherein the welding simulation data comprises data representative of a past or current welding technique parameter, bead profile, position or orientation of a welding tool, position or orientation of a workpiece, wire feed speed, voltage, current, wire diameter, wire type, workpiece material type, workpiece material thickness, gas type, gas flow rate, joint position, joint type, joint geometry, simulation exercise, or pulse frequency.

19. The welding simulation system of claim 15, wherein the one or more second simulation stimuli are further generated based on whether there is an indication that a welding-type tool has been activated, wherein the indication comprises a signal representative of a trigger or foot pedal activation received from the welding-type tool or the welding simulator, a recognition of an activation indicator in the sensor data, or a recognition that the sensor data represents a workpiece and an electrode of the welding-type tool being separated by less than a threshold distance.

20. The welding simulation system of claim 15, wherein the simulator interface comprises a simulator display screen and the device interface comprises a device display screen,
the simulator memory circuitry comprising first machine readable instructions which, when executed by the simulator processing circuitry, further cause the simulator processing circuitry to:
display a welding environment on the simulator display screen from the first perspective, the welding environment being augmented by the first simulation stimuli, and
the device memory circuitry comprising second machine readable instructions which, when executed by the device processing circuitry, further cause the device processing circuitry to:
display the welding environment on the device display screen from the second perspective, the welding environment being augmented by the second simulation stimuli.

* * * * *